Patented Dec. 8, 1942

2,304,104

UNITED STATES PATENT OFFICE 2,304,104

THERAPEUTICAL ZINC PEROXIDE

Walter Klabunde, Niagara Falls, Paul La Frone Magill, Ransomville, and Joseph S. Reichert, Niagara Falls, N. Y., assignors to E. I. du Pont de Nemours & Company, Wilmington, Del., a corporation of Delaware No Drawing. Application December 10, 1938, Serial No. 244,918

21 Claims. (Cl. 23—147)

This invention relates to a new therapeutic product and to a process for preparing the same. More particularly, it relates to a new therapeutic product for the treatment of anaerobic or microaerophilic or certain aerobic infections.

The germicidal properties of zinc peroxide preparations have been known to the medical art for a long period of time. The commercial zinc peroxide preparations are usually a mixture of zinc oxides, zinc hydroxides and zinc carbonate containing about 40 to 50% zinc peroxide calculated as $ZnO_2$. It has been suggested to use such zinc peroxide preparations in the treatment of several dermatologic diseases. However, heretofore practical employment of zinc peroxide preparations has been more or less restricted to deodorants and similar cosmetic preparations. Experiences with zinc peroxide preparations for therapeutic purposes have not been quite satisfactory. The results obtained in some cases could not be readily reproduced in similar cases at other times, and generally the use of a zinc peroxide preparation as a medication was discontinued. More recently the therapeutic effects of zinc peroxide have been investigated from the bacteriological viewpoint. It was found that zinc peroxide has a specific action on anaerobic and microaerophilic and on certain aerobic infections. Certain surgical infections caused by microaerophilic hemolytic streptococci which heretofore could not be successfully treated were favorably acted on by zinc peroxide. However, many difficulties were encountered in these experiments also. Clinical experiments showed that various samples of zinc peroxide preparations, which had been made by identical procedures and which yielded substantially identical chemical analysis varied widely in their therapeutic effects. Moreover, some of the samples formed plaster-like cakes in the wounds to which they were applied and acted as a foreign body. Other samples did not cake quite so badly, but nevertheless could only be removed with difficulty from the wounds, which was painful to the patients and impaired the healing process. Also, the presence of gritty particles in most of the available zinc peroxide preparations caused considerable trouble.

Further investigations seemed to indicate that the physical properties of the medicine are of material influence on its effectiveness.

In order to provide even distribution of the zinc peroxide preparations and to prevent caking of the material it was attempted to apply them in the form of oily or fatty suspensions. However, experiments indicated that the effectiveness of the drug depend to a considerable degree on the presence of water.

Our invention is concerned with a new therapeutic product which contains zinc peroxide as the active agent and which offers certain physical properties to provide in aqueous suspension the necessary environment to inhibit or destroy the causative organisms.

An object of our invention is a new therapeutic product which may be obtained by the reaction of a zinc salt solution and a water soluble metal peroxide or hydrogen peroxide and which has substantially no tendency to form firm cakes in the presence of water and is substantially free from gritty material. Another object of our invention is a process for preparing said new therapeutic product in a uniform way so as to provide a drug of standard properties. Further objects will be hereinafter apparent.

The above objects of our invention may be accomplished by providing a therapeutic product which is prepared by reacting a zinc salt solution and a water-soluble metal peroxide or hydrogen peroxide and by adjusting the pH of the resultant reaction mixture to a desired value. Our new therapeutic product which is prepared in the above manner is a finely divided powder having talc-like consistency. It has certain properties which provide the necessary environment to inhibit or destroy the infectious organisms. These peculiar properties are due to the specific pH range utilized for preparing our new product, and cannot be easily determined by physical tests. However, the following test was found valuable in evaluating the caking tendency of our new product.

For carrying out this test approximately 100 grams of the material are dry sterilized by heating in a 250 cc. Erlenmeyer flask at 140° C. for four hours. The zinc peroxide is then cooled to room temperature and thoroughly mixed. Five grams of the sterilized material are introduced into a 50 cc. glass stoppered graduated cylinder. Distilled water is added to the 50 cc. mark and the mixture thoroughly shaken. In case the volume decreases, water is added to fill the cylinder up to the 50 cc. mark. The cylinder is then set into a 29° C. bath, covered with a beaker and retained therein for 24 hours. Then the cylinder is taken out of the bath and a glass rod of 20 inches length and ⅛ inch diameter is dropped from the margin of the cylinder into the undisturbed precipitate and the volume through which the rod does not penetrate is noted. The contents of the cylinder then are poured out and the cylinder is refilled with water and emptied again without shaking. This procedure is repeated three times and the volume of cake retained in the bottom of the cylinder and any scale adhering to the sides is noted. Our new product, when subjected to this test, does not form any plaster-like firm cake on the bottom of the cylinder and the glass rod drops to the bottom of the cylinder. After three simple washings substantially no cake will remain in the cylinder and at most a thin film of a soft cream like suspension will adhere to the lower parts of the wall of the cylinder.

A further specification which our new product meets is that it contains substantially no gritty material, a fact which can be easily determined by inspection or screen tests.

Besides these properties, it is desirable that the product, when shaken with 20 times the amount of distilled water by weight and allowed to stand for at least 15 minutes, produces in the slurry a pH not higher than 8.8. Also, for best germicidal properties, the gas evolution of the product should be as close as possible to 0.33 cc. per hour or more, during the last 4 hours of a 24 hour gas evolution test, which consists in heating a slurry containing 25 grams zinc peroxide in 125 cc. distilled water at 37.5° C. However, the gas evolution of the product is not an object of our invention, and products having a gas evolution higher than 0.33 cc. per hour and a process for preparing these products are the object of a co-pending application by Newton C. Jones and Donald O. Notman, Serial No. 236,326 filed October 21, 1938.

As indicated above, our new product is obtained by reacting a zinc salt solution and a water-soluble peroxide or hydrogen peroxide and by adjusting the pH of the resultant reaction mixture to a desired value.

Heretofore in the preparation of zinc peroxide preparations many difficulties were encountered in obtaining products of consistent physical properties, and furthermore, these products were not suited for the object of our invention, since they were not free of gritty material and had a distinct tendency to cake when contacted with water or when applied to open wounds. Heretofore zinc peroxide was ordinarily prepared by reacting a zinc chloride solution with solid sodium peroxide. For cosmetic purposes zinc peroxide sometimes was prepared by reacting zinc oxide with hydrogen peroxide. In the preparation of zinc peroxide from sodium peroxide and zinc hydroxide it has been suggested to combine sodium peroxide with a strong inorganic acid to obtain a hydrogen peroxide solution and reacting this hydrogen peroxide solution with zinc hydroxide.

The products obtained with these known procedures were not satisfactorily for therapeutic purposes. Even under careful control of the manufacturing process, products obtained from different batches were considerably different in their physical properties. Good therapeutic effects obtained with these products were only accidental and inconsistent.

A convenient way of preparing our new therapeutic product consists in reacting a solution of a zinc salt with a water-soluble metal peroxide or hydrogen peroxide or mixtures of these substances and in adjusting the resultant reaction mixture to a pH value of above 9.5. Best results are obtained by adjusting the pH to about 10.5. Increasing the pH of the reaction mixture gives rise to products with a higher degree of swelling and at pH values above approximately 11.5 materials which form gel-like products in the presence of water are obtained. We prefer, therefore, to adjust the reaction mixture to a pH of from about 9.5 to 11.5, although products obtained at higher pH values might also be suitable for some medical applications. It has also been found that superior products may be obtained with all the raw materials in aqueous solution.

The physical properties of our new therapeutic product may be more greatly enhanced by careful regulation of the reaction. Thus, by carefully regulating the addition of the raw materials to each other a product may be obtained having physical properties of the highest quality.

This modified may of carrying out the process for preparing our new therapeutic product consists in dissolving the raw materials and adding the solutions to each other simultaneously at a slow feeding rate and adjusting the pH of the resulting reaction mixture. This gradual addition of the dissolved raw materials to each other at a slow controlled feeding velocity makes it also possible to control the pH throughout the reaction, so that no substantial variations in the pH occur, and even local variations in pH can be substantially avoided. It has been found that in carrying out this modified procedure the preferred range of pH is somewhat lower than that required for a process starting with a batch containing the total amount of reactants, and even pH values as low as 8.5 can be utilized. The best results in preparing our new therapeutic product according to this modified way of carrying out our invention are obtained by keeping the pH at about 9 to 9.5, though pH values up to 11 are still satisfactory. As before, at higher pH values products of a higher degree of swelling are obtained.

The uniformity of the reaction product can be further enhanced by providing efficient stirring in the reaction vessel to which the solutions of the reactants are simultaneously fed. It is believed that the slow and simultaneous addition of the reactants and their thorough mixing by vigorous stirring has also a beneficial effect on the uniform settling of the material, thus further enhancing the physical properties of the product.

Since the reaction leading to the formation of our new product proceeds almost instantaneously, the rate of feeding the solutions of the reactants should be relatively slow and the stirring in the reaction vessel should be vigorous. The relative amounts and the relative feeding velocities of the solutions of the reactants, are, of course, dependent on their concentration and temperature, and should be always adjusted so as to provide the desired pH in the reaction mixture without any substantial temporary variations. The necessary feeding velocity, however, can be easily determined by tests and will also be dependent on the desired fineness and quality of the product.

Thus, it has been found that when utilizing an aqueous solution of zinc chloride containing about 18 grams zinc chloride per liter of water and an aqueous solution of sodium peroxide containing about 10 grams sodium peroxide per liter of water, a feeding rate of up to 0.6 liter per minute for each of the solutions is suitable, and even speeds up to 1.5 liters per minute give satisfactory results. For higher concentrations, of course, lower feeding rates will be suitable, and for lower concentrations higher feeding rates can be used; as a rule in the same type of apparatus it may be said that about the same amount of zinc in the form of a zinc salt solution should be fed into the reaction vessel per minute. Of course when changing the dimensions of the apparatus, for example when changing the diameter of the feeding pipes or the like, the conditions will have to be varied accordingly. In any case, where the dimensions of the feeding device are not exceedingly small, an efficient stirring device should be provided in the reaction vessel so as to provide immediate and thorough mixing of the reactants. Thus when in some of the appended claims the rate of feeding of the solutions is defined as equivalent to the feeding rates of zinc chloride and sodium peroxide solutions of the above specified concentrations, it is apparent to anyone skilled in the art how such equivalent rates can be determined for other concentrations and for other raw materials.

In carrying out the process of the invention, the concentrations of the solutions can be varied within wide limits. Care, however, must be taken that none of the dissolved sodium peroxide goes out of solution, and the temperature of the sodium peroxide solution should be kept at or above 10° C., e. g. at room temperature. The zinc chloride solution should always contain a slight amount of acid, such as hydrochloric acid, to prevent hydrolysis of the zinc chloride and thus prevent precipitation of basic zinc salts. Where the term "zinc salt solution" is used throughout the specification, this is to be understood as a zinc salt solution which is substantially free of any precipitated or colloidally dispersed basic zinc salt.

The reaction temperature can be varied within wide limits, but it is preferred to carry out the process of the invention at relatively low temperatures, such as at room temperatures and below, e. g. 18° C., so as to avoid any excessive loss of active oxygen. The resultant slurry is then preferably cooled to about 0° to 5° C.

Our new therapeutic product has also the marked advantage that its pH in an aqueous suspension as a rule is much lower than that of those heretofore obtained. Thus a slurry which has been formed by shaking 5 grams of sterilized zinc peroxide with 100 cc. of distilled water and which has been allowed to stand for about 15 minutes generally has a pH lower than 8.8, while zinc peroxide as obtained by the heretofore used processes usually has, under the same conditions, a pH of above 9.

It should be pointed out that for best results the freshly prepared and filtered zinc peroxide should be washed for a prolonged time and then be preferably air-dried.

Although as a rule the process of the invention makes it unnecessary to carbonate our new therapueutic product to lower its pH, the product may be advantageously carbonated in the usual way to further improve its physical properties.

Before use our new product should be dry sterilized. The dry sterilization not only kills any infectious organisms which may contaminate the product, but also beneficially affects its therapeutic properties although its content in $ZnO_2$ is somewhat lower. Our product may be dry sterilized at about 140° C. for about 1 to 4 hours, preferably for about 4 hours. Care should be taken that during sterilization the temperature does not rise higher than to about 141 to 142° C.

Our new product in the unsterilized state contains about 45 to 55% zinc peroxide calculated as $ZnO_2$, the remainder consisting substantially of zinc hydroxide, zinc oxide and zinc carbonate.

Our invention is further illustrated by the following example.

*Example*

185 pounds of anhydrous zinc chloride were dissolved in about 118 gallons of water and 3.6 liters of pure 37% hydrochloric acid were added to dissolve the precipitate formed by partial hydrolysis of the zinc chloride. The thus prepared solution was cooled to 7–8° C. and maintained at this temperature. At the same time a sodium peroxide solution was prepared from 104 pounds of sodium peroxide and 118 gallons of water. This sodium peroxide solution was cooled to about 10–12° C. and maintained at this temperature.

The zinc chloride solution and the sodium peroxide solution were then passed from two separate feeding vessels through sensitive flow-meters into a small vessel, where they were thoroughly mixed by a high speed stirrer. The rate of addition of each of the solutions was kept at about 0.6 liter per minute. The actual feeding speed of each of the solutions, however, was at all times regulated so as to maintain the pH in the mixer between 9.0 and 9.5.

After passing through the mixer, which required about 2–3 minutes, the slurry was fed into a large storage vessel. The temperature in this vessel was kept at about 0°–5° C. Also, in this vessel the pH was controlled within the range of 9.0 to 9.5 by the suitable addition of zinc chloride or sodium peroxide solutions respectively.

The slurry then was run into a filter box and was filtered under suction. The residue was washed four times with water.

The zinc peroxide then was removed from the filter and immediately dried in an air dryer at 55–60° C. for 15–20 hours. After about 5 hours drying the material was broken up to secure more uniform drying. The dry material which already was of a very fine grain and which contained no gritty material was rapidly passed through a micro mill so that at least 99% of the product passed a 100 mesh screen.

If desired, the resulting product then can be carbonated by agitating from 30 to 45 minutes in an atmosphere of $CO_2$ to lower the pH of the final product. However, the pH of the final product as obtained by this process is about 7.8, so that usually carbonation is not necessary, if carbonation is not desired for further increasing the physical properties of the product.

The products thus obtained were in a powdery, finely divided form and free from gritty material. Samples of this product were subjected to the above described caking test and it was found to be satisfactory.

Our new therapeutic product may be advantageously used for the treatment of various diseases. Our new product is particularly indicated for surgical infections caused by hemolytic streptococci and for foul smelling infections of dental origin which occur in the face or neck in which the anaerobic hemolytic streptococcus and the spirochetes and fusiform bacilli are the etiological agents. Likewise the use of our new product is indicated for neck infections from perforations of the esophagus, lung abscesses, chronic abdominal sinuses, fistulas, progressive gangrenous infections of the skin due to synergistic bacterial action, and chronic undermining burrowing ulcers of the non-gangrenous type. Also gas gangrene or tetanus resulting from gunshot wounds or street injuries may be favorably acted upon by our new therapeutic product.

Our new material may also be used advantageously as a prophylactic in accidental and surgical operative wounds where contamination with anaerobic and micro-aerophilic organisms is suspected or inevitable. The application of our new material to the wound surfaces gives intimate contacts so that infecting organisms are either killed or prevented from multiplying in the tissues.

Inasmuch as anaerobic and microaerophilic organisms are prevalent throughout the alimentary canal, our new product may be effectively applied prophylactically before operations on the mouth and before dental extractions.

Our new product allows of very effective application and provides optimum conditions for therapeutic and prophylactic uses. However, care should be taken that it is kept dry prior to use. As a rule before application the material will be sterilized in conveniently small quantities of from 10 to 50 grams in glass tubes at about 140° C. for about four hours. The material then may be thoroughly mixed by means of a syringe with enough sterile distilled water to give an even creamy suspension. The mixture should be spread over the surface to be treated in such a way that it comes in contact with every part of the infected tissues. Into sinuses beneath skin flaps our new material may be introduced by catheters, small tubes or by means of fine meshed gauze or silk which has been dipped into the suspension. For prophylactic uses our new material may also be used as a wash, e. g. as a mouth wash, preliminary to oral or dental surgery. Our new product may also be used as a dusting powder.

Our new product can always be easily washed off the treated tissues. Due to its finely divided form and the absence of the tendency to form firm cakes the infected and surrounding tissues are not irritated by the dressing. This is of especial advantage, because many of the infections of the above described type have to be treated throughout a long period of time, and frequent redressing of the infected tissues is desirable.

In carrying out the process for preparing our new therapeutic product other zinc salts than the salts used in the examples can be used with advantage, thus as for example zinc sulfate, etc., always providing that any formation of basic zinc salts in the starting solution is avoided. Likewise also, instead of sodium peroxide other water-soluble oxygen-yielding compounds capable of reacting with zinc salts to form zinc peroxide can be used, as will be apparent to any skilled chemist. Thus, for example, other water-soluble metal peroxides and hydrogen peroxide or mixtures thereof may be used. Preferably we use as raw materials aqueous solutions of the above mentioned compounds so as to provide a homogeneous reaction medium for the formation of our new product.

Our invention is not restricted to the use of our new therapeutical product for any of the above purposes nor to the process described in the examples, but is to be understood as defined in the appended claims.

We claim:

1. A therapeutic product prepared by reacting an aqueous solution of a zinc salt with an aqueous alkaline solution of a water-soluble active oxygen-yielding compound selected from the group which consists of hydrogen peroxide and the metal peroxides, said reaction being carried out under conditions wherein the pH value of the reaction mixture is at all times maintained within the range 9.5 to 11.5, said therapeutic product constituting a finely divided powder, substantially free from gritty material and being characterized by remaining finely divided and non-caking when suspended in water.

2. A therapeutic product prepared by reacting an aqueous solution of a zinc salt with an aqueous alkaline solution of a water-soluble active oxygen-yielding compound selected from the group which consists of hydrogen peroxide and the metal peroxides, said reaction being carried out under conditions wherein the pH value of the reaction mixture is at all times maintained at about 9.5, said therapeutic product constituting a finely divided powder, substantially free from gritty material and being characterized by remaining finely divided and non-caking when suspended in water.

3. A therapeutic product prepared by the process of reacting zinc chloride with sodium peroxide which comprises the steps of bringing said zinc chloride and sodium peroxide together in aqueous solution under conditions wherein the pH value of the reaction mixture is at all times maintained above 9.5, said therapeutic product constituting a finely divided powder substantially free from gritty material and being characterized by remaining finely divided and non-caking when suspended in water.

4. A therapeutic product prepared by the process which comprises reacting zinc chloride and sodium peroxide under conditions wherein the pH of the resulting reaction mixture is at all times maintained at a pH value of substantially 10.5, said therapeutic product constituting a finely divided powder substantially free from gritty material and being characterized by remaining finely divided and non-caking when suspended in water.

5. A therapeutic product prepared by the process which comprises reacting an aqueous solution of a zinc salt with an aqueous alkaline solution of an active oxygen-yielding water-soluble compound selected from the group which consists of hydrogen peroxide and the metal peroxides, the reactants being added to each other simultaneously at controlled, slow rates of addition, each rate of addition being so adjusted with reference to the other that the pH of the resulting reaction mixture is at all times maintained above 8.5, said therapeutic product constituting a finely divided powder substantially free from gritty material and being characterized by remaining finely divided and non-caking when suspended in water.

6. A therapeutic product prepared by the process which comprises reacting an aqueous solution of a zinc salt with an aqueous alkaline solution of an active oxygen-yielding, water-soluble compound selected from the group which consists of hydrogen peroxide and the metal peroxides, the solutions of the reactants being added to each other simultaneously and at controlled, slow rates of addition so selected that the resultant reaction mixture is at all times during the reaction maintained at a pH within the range 8.5 to 11, said therapeutic product constituting a finely divided powder substantially free from gritty material and being characterized by remaining finely divided and non-caking when suspended in water.

7. A therapeutic product prepared by the process which comprises reacting an aqueous solution of a zinc salt and an aqueous alkaline solution of a water soluble, active oxygen yielding compound selected from the group which consists of hydrogen peroxide and the metal peroxides, the aqueous solutions of the reactants being added to each other simultaneously and at controlled slow rates of addition equivalent to the the addition of an aqueous solution of a zinc salt containing substantially 8.63 grams of zinc per liter and to the addition of a solution of a peroxide containing substantially 2.05 grams of active oxygen per liter simultaneously to each other at feeding rates up to 1.5 liters of each of the solutions per minute, said controlled, slow rates of addition serving to maintain the pH of the resulting reaction mixture at a value above 8.5 throughout the reaction, said therapeutic product constituting a finely divided powder substantially free from gritty material and being characterized by remaining finely divided and non-caking when suspended in water.

8. The process of preparing a therapeutic product which comprises reacting an aqueous solution of a zinc salt with an aqueous alkaline solution of an active oxygen-yielding, water-soluble compound selected from the group which consists of hydrogen peroxide and the metal peroxides, the reactants being added to each other simultaneously at controlled, slow rates of addition, each rate of addition being so adjusted with reference to the other that the pH of the resulting reaction mixture is maintained at all times above 8.5.

9. The process of preparing a therapeutic product which comprises reacting an aqueous solution of a zinc salt with an aqueous alkaline solution of an active oxygen-yielding, water-soluble compound selected from the group which consists of hydrogen peroxide and the metal peroxides, the solutions of the reactants being added to each other simultaneously and at controlled, slow rates of addition so selected that the resultant reaction mixture is at all times during the reaction maintained at a pH within the range 8.5 to 11.

10. The process of preparing a therapeutic product which comprises reacting an aqueous solution of a zinc salt and an aqueous alkaline solution of a water-soluble, active oxygen-yielding compound selected from the group which consists of hydrogen peroxide and the metal peroxides, the aqueous solution of the reagents being added to each other simultaneously and at controlled, slow rates of addition equivalent to the addition of an aqueous solution of a zinc salt containing subtantially 8.63 grams of zinc per liter and to the addition of a solution a peroxide containing substantially 2.05 grams of active oxygen per liter simultaneously to each other at feeding rates up to 1.5 liters of each of the solutions per minute, said controlled, slow rates of addition serving to maintain the pH of the resultant reaction mixture at a value above 8.5 throughout the reaction.

11. The process of preparing a therapeutic product which comprises reacting an aqueous solution of a zinc salt and an aqueous alkaline solution of a water-scluble, active oxygen-yielding compound selected from the group which consists of hydrogen peroxide and the metal peroxides, the aqueous solutions of the reagents being added to each other simultaneously at controlled, slow rates of addition equiavlent to the addition of an equeous solution of a zinc salt containing substantially 8.63 grams of zinc per liter and a solution of a peroxide containing substantially 2.05 grams of active oxygen per liter simultaneously to each other at feeding rates up to about 1.5 liters of each of the solutions per minute, said rates of addition being such that the pH value of the resultant reaction mixture remains within the range 8.5 to 11 throughout substantially the entire process.

12. A process of preparing a therapeutic product which comprises reacting an aqueous solution of a zinc salt and an aqueous alkaline solution of a water-soluble, active oxygen-yielding compound selected from the group which consists of hydrogen peroxide and the metal peroxides, the aqueous solutions of the reagents being added to each other simultaneously at controlled, slow rates of addition equivalent to the addition of an aqueous solution of a zinc salt containing substantially 8.63 grams of zinc per liter and a solution of a peroxide containing substantially 2.05 grams of active oxygen per liter simultaneously to each other at feeding rates up to about 1.5 liters of each of the solutions per minute, said rates of addition being such that the pH value of the resultant reaction mixture remains within the range 9 to 9.5 throughout substantially the entire process.

13. A process of preparing a therapeutic product which comprises reacting an aqueous solution of a zinc salt containing about 18 grams of zinc chloride per liter with a solution of sodium peroxide containing about 10 grams of sodium peroxide per liter, the aqueous solutions of the reagents being added to each other simultaneously at feeding rates up to 1.5 liters per minute of each of the solutions, said rates of addition being such that the pH value of the resultant reaction mixture remains above 8.5.

14. A process of preparing a therapeutic product which comprises reacting an aqueous solution of zinc chloride containing about 18 grams of zinc chloride per liter with a sodium peroxide solution containing about 10 grams of sodium peroxide per liter, the aqueous solutions of the reagents being added to each other simultaneously at controlled rates of addition up to about 0.6 liter of each of the solutions per minute, said rates of addition being such that the pH value of the resultant reaction mixture remains within the range 9 to 9.5 throughout substantially the entire process.

15. The process of preparing a therapeutic product which comprises reacting an aqueous solution of zinc chloride containing 18 grams of zinc chloride per liter and an aqueous solution of sodium peroxide containing about 10 grams of sodium peroxide per liter, the aqueous solutions of the reagents being added to each other simultaneously and at controlled slow rates of addition up to about 0.6 liter of each of the solutions per minute, said controlled slow rates of addition being sufficient to maintain the pH of the reaction mixture substantially within the range 8.5 to 11 during the reaction, separating the resulting precipitated zinc peroxide from the mother liquor, washing said zinc peroxide, drying said zinc peroxide, subjecting said zinc peroxide product to carbonation, then sterilizing the resulting product by subjecting it to a temperature of 140° C. for from one to four hours.

16. The process of preparing a therapeutic product by reacting in aqueous solution a zinc salt and an aqueous alkaline solution of an active oxygen-yielding soluble compound selected from the group which consists of hydrogen peroxide and the metal peroxides which comprises bringing said reagents together in the aqueous reaction mixture under conditions wherein the pH value of the reaction mixture is continuously maintained at above 9.5 and recovering the precipitated therapeutic product from the reaction mixture.

17. A process of preparing a therapeutic product by reacting in aqueous solution a zinc salt and an aqueous alkaline solution of an active oxygen-yielding soluble compound selected from the group which consists of hydrogen peroxide and the metal peroxides, which comprises bringing said reagents together in the aqueous mixture under conditions wherein the pH value of said reaction mixture is continuously maintained during the reaction within the range 9.5 to 11.5 and recovering the precipitated therapeutic product from the reaction mixture.

18. The process of preparing a therapeutic product by reacting zinc chloride with sodium peroxide which comprises the steps of bringing said zinc chloride and sodium peroxide together in aqueous solution under conditions wherein the pH value of the reaction mixture is at all times maintained above 9.5, and recovering the precipitated product from the reaction mixture.

19. The process of preparing a therapeutic product which comprises reacting zinc chloride with sodium peroxide under conditions wherein the pH of the resulting reaction mixture is at all times maintained at a pH value of substantially 10.5.

20. The process of preparing a therapeutic product which comprises reacting an aqueous solution of a zinc salt and a water-soluble active oxygen-yielding compound selected from the group which consists of hydrogen peroxide and the metal peroxides, said reactants being brought together in an aqueous reaction mixture whose pH is continuously controlled throughout the reaction so that it is maintained within the range 8.5 to 11.

21. A therapeutic product prepared by reacting an aqueous solution of a zinc salt and a water-soluble active oxygen-yielding compound selected from the group which consists of hydrogen peroxide and the metal peroxides, said reactants being brought together in an aqueous reaction mixture whose pH is continuously controlled throughout the reaction so that it is maintained within the range 8.5 to 11.

WALTER KLABUNDE.
PAUL LA FRONE MAGILL.
JOSEPH S. REICHERT.